(12) United States Patent
Takajo et al.

(10) Patent No.: US 12,467,104 B2
(45) Date of Patent: Nov. 11, 2025

(54) METHOD FOR FORMING GROOVES ON METAL STRIP SURFACE AND METHOD FOR MANUFACTURING GRAIN-ORIENTED ELECTRICAL STEEL SHEET

(71) Applicant: JFE STEEL CORPORATION, Tokyo (JP)

(72) Inventors: Shigehiro Takajo, Tokyo (JP); Takeshi Omura, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 455 days.

(21) Appl. No.: 18/246,334

(22) PCT Filed: Jul. 2, 2021

(86) PCT No.: PCT/JP2021/025198
§ 371 (c)(1),
(2) Date: Mar. 23, 2023

(87) PCT Pub. No.: WO2022/074883
PCT Pub. Date: Apr. 14, 2022

(65) Prior Publication Data
US 2023/0357875 A1    Nov. 9, 2023

(30) Foreign Application Priority Data
Oct. 6, 2020    (JP) .................................. 2020-169442

(51) Int. Cl.
*C21D 8/12* (2006.01)
*C21D 6/00* (2006.01)
(Continued)

(52) U.S. Cl.
CPC ........... *C21D 8/1277* (2013.01); *C21D 6/005* (2013.01); *C21D 6/008* (2013.01); *C21D 8/1222* (2013.01);
(Continued)

(58) Field of Classification Search
CPC . B23K 26/362; B23K 26/364; H01F 1/14775; H01F 1/14783; H01F 1/16;
(Continued)

(56) References Cited

U.S. PATENT DOCUMENTS 11,045,902 B2   6/2021  Takajo et al.
2018/0017868 A1   1/2018  Suehiro et al.
(Continued)

FOREIGN PATENT DOCUMENTS

CN   107208304 A   9/2017
CN   107849631 A   3/2018
(Continued)

OTHER PUBLICATIONS

Computer-generated translation of JP 2002-071932 (A) (Applicants: Toppan Printing Co Ltd, Inventors: Nagano Katsuichi et al.), originally published on Mar. 12, 2002. (Year: 2002).*

(Continued)

*Primary Examiner* — Vanessa T. Luk
(74) *Attorney, Agent, or Firm* — KENJA IP LAW PC

(57) ABSTRACT

A method for forming grooves on a surface of a metal strip, having applying a coating agent for etching resist coating formation to a roller; then, irradiating a laser on the roller while scanning the laser in an axial direction of the roller or in a direction inclined to the axial direction to remove a portion of the coating agent for etching resist coating formation irradiated by the laser; then, bringing the roller into contact with at least one side of the metal strip to transfer the coating agent for etching resist coating formation to the at least one side of the metal strip, with an unapplied area corresponding to the removed portion of the coating agent for etching resist coating formation.

8 Claims, 5 Drawing Sheets

(51) Int. Cl.
| | |
|---|---|
| *C21D 9/46* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/12* | (2006.01) |
| *C22C 38/14* | (2006.01) |
| *H01F 1/147* | (2006.01) |

(52) U.S. Cl.
CPC ......... *C21D 8/1233* (2013.01); *C21D 8/1261* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C21D 2201/05* (2013.01); *C22C 2202/02* (2013.01); *H01F 1/14775* (2013.01)

(58) Field of Classification Search
CPC ....... H01F 1/18; C21D 8/1277; C21D 8/1283; C21D 8/1288; C21D 8/1294
See application file for complete search history.

(56) References Cited

U.S. PATENT DOCUMENTS

| | | |
|---|---|---|
| 2018/0119242 A1 | 5/2018 | Kobayashi |
| 2018/0147663 A1 | 5/2018 | Takajo et al. |
| 2018/0281016 A1 | 10/2018 | Goto et al. |

FOREIGN PATENT DOCUMENTS

| | | |
|---|---|---|
| JP | H0732575 A | 2/1995 |
| JP | H11279646 A | 10/1999 |
| JP | 2002071932 A | 3/2002 |
| JP | 2015071815 A | 4/2015 |
| JP | 2017025377 A | 2/2017 |
| JP | 6172403 B2 | 8/2017 |
| JP | 6332185 B2 | 5/2018 |
| WO | 2016129235 A1 | 8/2016 |

OTHER PUBLICATIONS

Jan. 3, 2025, Office Action issued by the China National Intellectual Property Administration in the corresponding Chinese Patent Application No. 202180067721.2 with English language search report.
Sep. 21, 2021, International Search Report issued in the International Patent Application No. PCT/JP2021/025198.
Jun. 3, 2024, the Extended European Search Report issued by the European Patent Office in the corresponding European Patent Application No. 21877187.1.

* cited by examiner

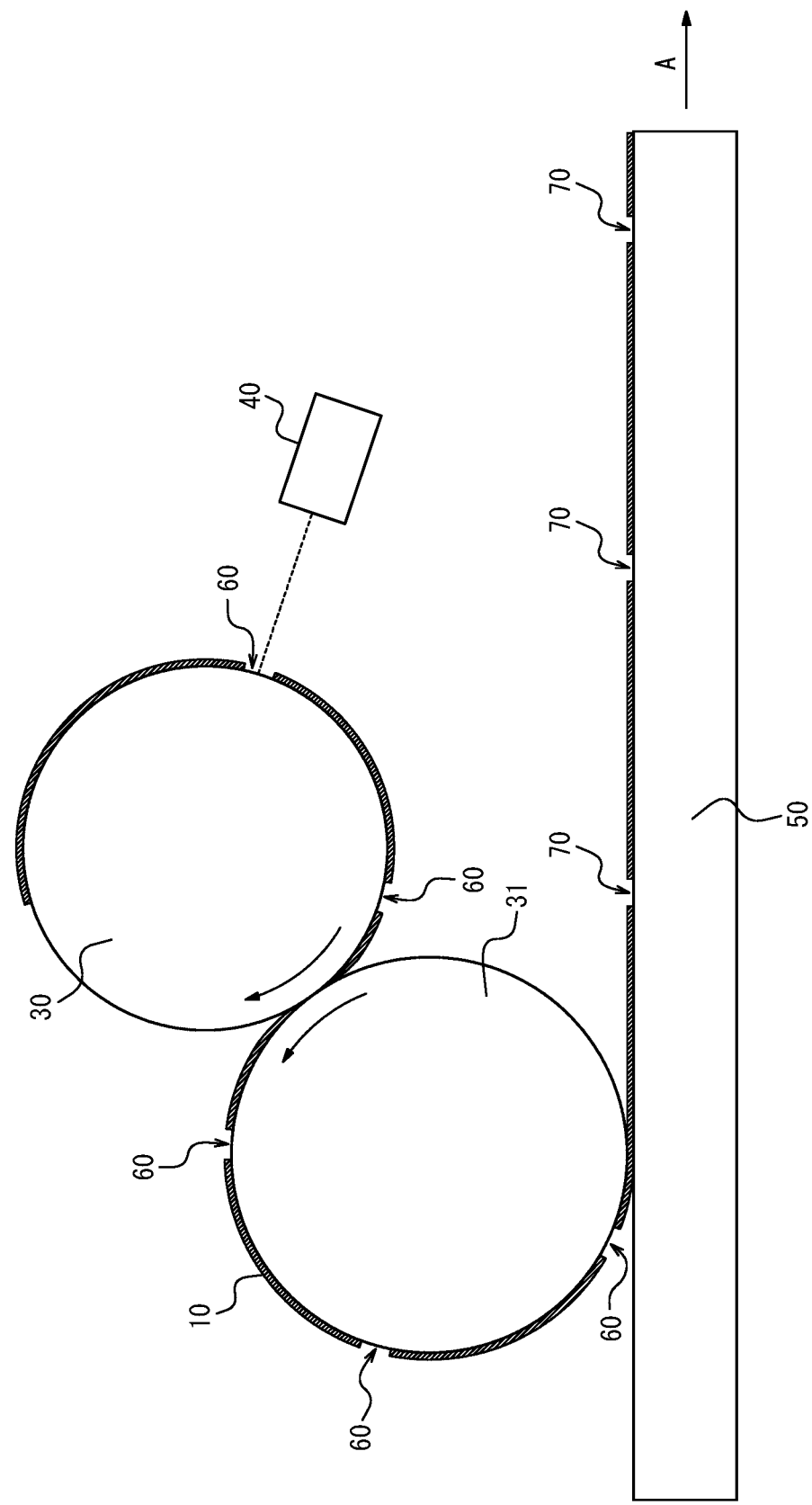

METHOD FOR FORMING GROOVES ON METAL STRIP SURFACE AND METHOD FOR MANUFACTURING GRAIN-ORIENTED ELECTRICAL STEEL SHEET

TECHNICAL FIELD

This disclosure relates to a method for forming grooves on a surface of a metal strip such as grain-oriented electrical steel sheet used for iron cores of electrical equipment such as transformers, and to a method for manufacturing a grain-oriented electrical steel sheet by using the method for forming grooves.

BACKGROUND

Grain-oriented electrical steel sheets are mainly used as materials for iron cores inside transformers. In order to improve the energy usage efficiency of transformers, there is a demand for reducing iron loss in grain-oriented electrical steel sheets. One technique to reduce iron loss in grain-oriented electrical steel sheets is to refine the magnetic domain structure by forming grooves and other irregular portions on the steel sheet surface. Known methods for forming grooves on the steel sheet surface include pressing a gear-shaped roller against the steel sheet surface, using a laser beam to locally melt the steel substrate of the steel sheet, and using etching resist coating and etching a portion of the steel sheet surface below an etching resist-unapplied portion by chemical etching or electrolytic etching to thereby form grooves on the portion of the steel sheet surface below the etching resist-unapplied portion. Among these methods, the method using the etching resist coating is advantageous for efficiently forming deep grooves and has the advantage of high magnetic domain refining effect. However, in the method using the etching resist coating, as in other methods, it is extremely important to form grooves with high accuracy and uniformity.

Among the methods for forming grooves using the etching resist coating, as especially industrially advantageous one, there is a technique for locally removing a portion of the etching resist coating uniformly applied to the steel sheet surface by a laser beam and etching a portion of the steel sheet surface below the removed portion of the etching resist coating by chemical etching or electrolytic etching to thereby form grooves (JP6332185B (PTL 1)). Because under properly maintained conditions, the laser beam retains very uniform beam properties, very uniform grooves can be formed. On the other hand, as we have clarified in our previous research, in this method, the laser irradiated to remove the etching resist coating causes distortion and melting of the steel substrate, which may damage the magnetic properties of the steel sheet as a finished product. In contrast, JP6172403B (PTL 2) discloses a technique for removing the etching resist coating in a short time by using a high-output laser (with an output of 1.5 kW or more) to suppress thermal diffusion in the steel substrate during irradiation and obtain high magnetic properties.

CITATION LIST

Patent Literature

PTL 1: JP6332185B
PTL 2: JP6172403B

SUMMARY

Technical Problem

When the flatness of the metal strip is low, it is difficult to form uniform grooves in the widthwise direction by the technique described above, in which a part of the etching resist coating is locally removed by a laser beam and the steel sheet under the laser removal portion of the etching resist coating is etched to form grooves. For example, when the metal strip is a grain-oriented electrical steel sheet, especially a steel sheet with a high Si content, defective shape portions, such as edge wave shape (edge wave) and edge crack, are likely to occur at the edge of the steel sheet in the widthwise direction (transverse direction; TD (direction orthogonal to the rolling direction)). In such defective shape portions, there is a risk that the etching resist coating will remain without being removed due to the laser's inability to focus on the defective shape portions.

Therefore, it could thus be helpful to provide a technique to form uniform grooves in the widthwise direction of the metal strip, even if the metal strip has a defective shape portion, and to provide a grain-oriented electrical steel sheet with extremely excellent magnetic properties.

Solution to Problem

We thus provide the following.

[1] A method for forming grooves on a surface of a metal strip, comprising
  applying a coating agent for etching resist coating formation to a roller;
  then, irradiating a laser on the roller while scanning the laser in an axial direction of the roller or in a direction inclined to the axial direction to remove a portion of the coating agent for etching resist coating formation irradiated by the laser;
  then, bringing the roller into contact with at least one side of the metal strip to transfer the coating agent for etching resist coating formation to the at least one side of the metal strip, with an unapplied area corresponding to the removed portion of the coating agent for etching resist coating formation, or bringing the roller into contact with an intervening roller intervening between the roller and the metal strip and bringing the intervening roller into contact with at least one side of the metal strip to transfer the coating agent for etching resist coating formation to the at least one side of the metal strip, with an unapplied area corresponding to the removed portion of the coating agent for etching resist coating formation;
  then, drying the coating agent for etching resist coating formation to form an etching resist coating having the unapplied area on the at least one side of the metal strip; and
  then, etching a portion of the metal strip below the unapplied area to form grooves.

[2] The method for forming grooves on a surface of a metal strip according to [1], wherein the etching resist coating has a lightness $L^*$ in a CIELAB color space (CIE 1976 $L^*a^*b^*$ color space) of 0 or more and 70 or less, and an output of the laser is less than 2.0 kW.

[3] The method of forming grooves on a surface of a metal strip according to [1] or [2], wherein the laser has a strength profile of top-hat type.

[4] A method for manufacturing a grain-oriented electrical steel sheet, comprising
hot rolling a steel slab into a hot-rolled steel sheet,
then, subjecting the hot-rolled steel sheet or a hot-rolled and annealed sheet obtained by applying hot-rolled sheet annealing to the hot-rolled steel sheet to cold rolling once, or twice or more with intermediate annealing performed therebetween to obtain a cold-rolled steel sheet,
then subjecting the cold-rolled steel sheet to primary recrystallization annealing to obtain a primary recrystallized sheet, and
then, subjecting the primary recrystallized sheet to secondary recrystallization annealing to obtain a secondary recrystallized sheet,
wherein grooves are formed on a surface of the steel sheet at any stage after being subjected to hot rolling by the method for forming grooves according to any of [1] to [3].

Advantageous Effect

According to the present disclosure, a technique to form uniform grooves in the widthwise direction of the metal strip even if the metal strip has a defective shape portion can be provided, and thus a grain-oriented electrical steel sheet with extremely excellent magnetic properties can be provided.

BRIEF DESCRIPTION OF THE DRAWINGS

In the accompanying drawings:
FIG. 5 illustrates one example of the transfer method of a coating agent for etching resist coating formation of the present disclosure.

DETAILED DESCRIPTION

First, we describe the experiments that led to the development of this disclosure. In the following description, the "%" and "ppm" representations indicating the chemical composition of the steel sheet mean "mass %" and "mass ppm" unless stated otherwise. In the present specification, a numerical range expressed by using "to" means a range including numerical values described before and after "to", as the lower limit value and the upper limit value.

Experiment 1

Figure 1:
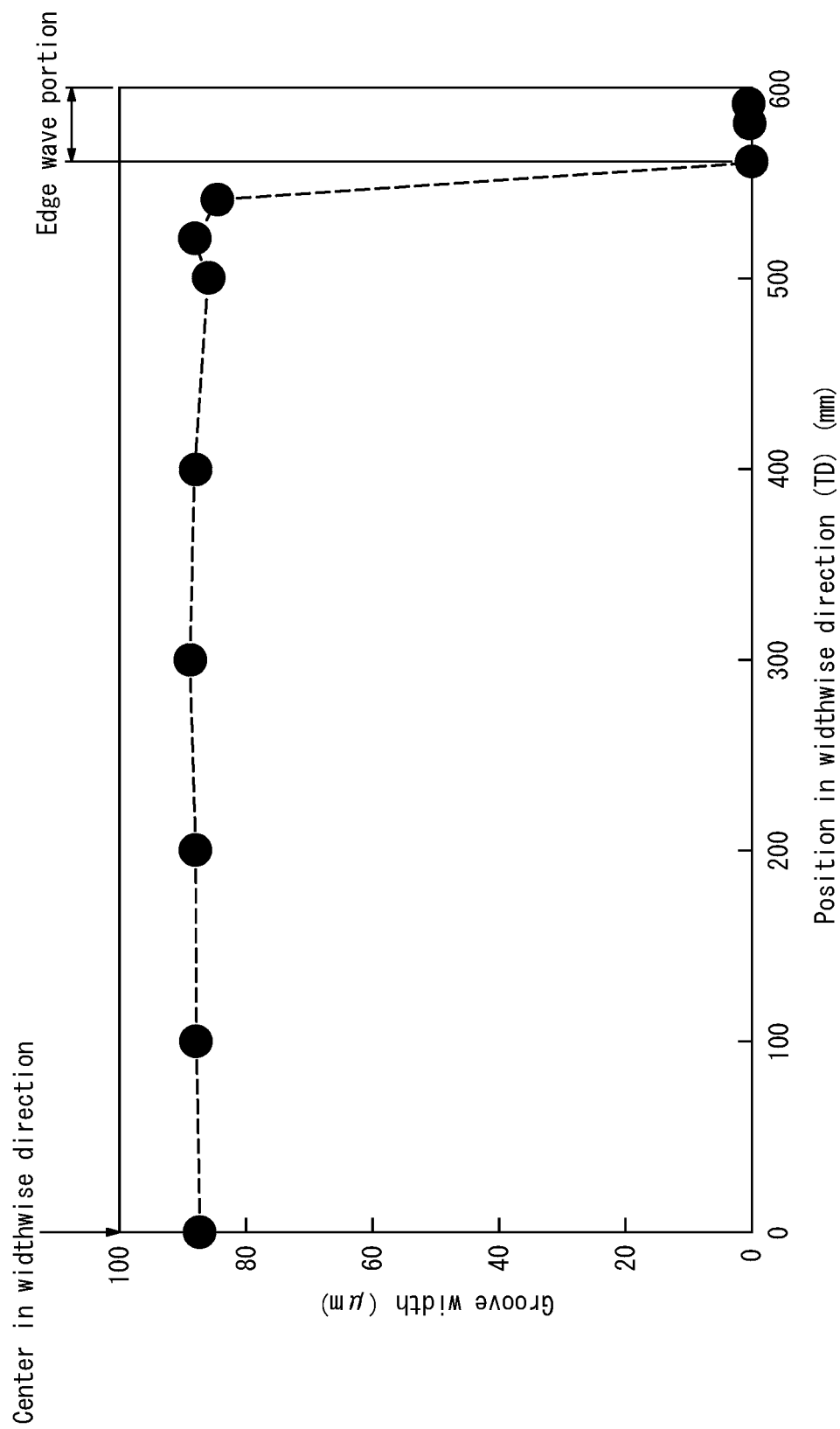
FIG. 1 illustrates the result of forming grooves on the steel sheet surface by the conventional technique.

First, the conventional method in which a portion of the etching resist coating uniformly applied to the steel sheet surface is locally removed by a laser beam, and a portion of the steel sheet surface below the removed portion of the etching resist coating (hereinafter referred to as laser removal portion) is etched was used to form grooves on the surface. First, cold-rolled steel sheets (C: 0.048%, Mn: 0.10%, P: 0.005%, S: 0.002%, Al: 0.008%, N: 42 ppm, Ti+Nb+V+Zr+Ta<0.001%) were prepared to form grooves. A steel slab having the chemical composition described above was hot rolled into hot-rolled steel sheets, then the hot-rolled steel sheets were subjected to hot-rolled sheet annealing at 1000° C. to obtain hot-rolled and annealed sheets, and the hot-rolled and annealed sheets were cold rolled into cold-rolled steel sheets with a thickness of 0.22 mm and a width of 1200 mm. The cold-rolled steel sheets were cut in half in the widthwise direction to obtain cold-rolled steel sheets with a width of 600 mm. In the cold-rolled steel sheets, the edge of one side in the widthwise direction was found to have a defective shape of edge wave. On the front and back surfaces of each of the cold-rolled steel sheets, a coating agent for etching resist coating formation having a water-based alkyd resin as the main component was uniformly applied with a gravure roll to form an etching resist coating. The etching resist coating was then locally removed by irradiating a laser beam on the cold-rolled steel sheet while scanning the laser beam in a direction that intersects a rolling direction. A single laser irradiation device with a diameter of 100 μm and an output of 1.8 kW was used for laser irradiation. A portion of the steel sheet surface below the laser removal portion was then etched to form linear grooves on the surface of the cold-rolled steel sheet. The etching resist coating remaining on the front and back surfaces of the cold-rolled steel sheet was completely removed after etching. The groove widths of the linear grooves formed on the cold-rolled steel sheets were measured using an optical microscopy. FIG. 1 illustrates the results.

FIG. 1 illustrates the distribution of groove widths in the widthwise direction (transverse direction; TD (direction orthogonal to the rolling direction)) of a steel sheet with a width of 600 mm. Edge wave was observed in the widthwise position of the steel sheet from 560 mm to 600 mm. The portion in which the edge wave is present is hereinafter referred to as edge wave portion. A uniform groove width was formed at positions without edge wave up to 540 mm in the widthwise direction, but in the edge wave portion, a portion of the etching resist coating was not removed (in the figure, the groove width was indicated as 0 μm).

In order to form uniform grooves in the widthwise direction of the metal strip, even at the edge of the metal strip, we have made an intensive study. First, we thought that by increasing the laser output, it might be possible to reliably remove the etching resist coating even from the defective shape portion of the metal strip, where the laser tends to shift the laser focus. However, in high-output lasers, it is difficult to reduce the diameter of the laser. It is known that the magnetic properties of a grain-oriented electrical steel sheet whose magnetic domains are refined by groove formation become good as the groove width becomes narrower. In the method where a portion of the uniformly applied etching resist coating is locally removed by a laser beam, it is most effective to reduce the beam diameter for removing the etching resist coating in order to form narrow grooves. However, since the beam diameter tends to increase as the output is higher, it is difficult to achieve both higher laser output and narrower groove width. While measures such as increasing the number of lasers installed and removing the etching resist coating by scanning low-output lasers with a small diameter over the steel sheet at a slower speed are effective, they are not free from other problems such as increased equipment and maintenance costs.

Experiment 2

Further, in the conventional method where a portion of an etching resist coating uniformly applied to the steel sheet surface is locally removed by a laser beam and a portion of the steel sheet surface under the laser removal portion is etched, we applied a high-output laser to form grooves on the steel sheet surface and found that, depending on the type of the etching resist coating, high magnetic properties may not be obtained.

Figure 2:
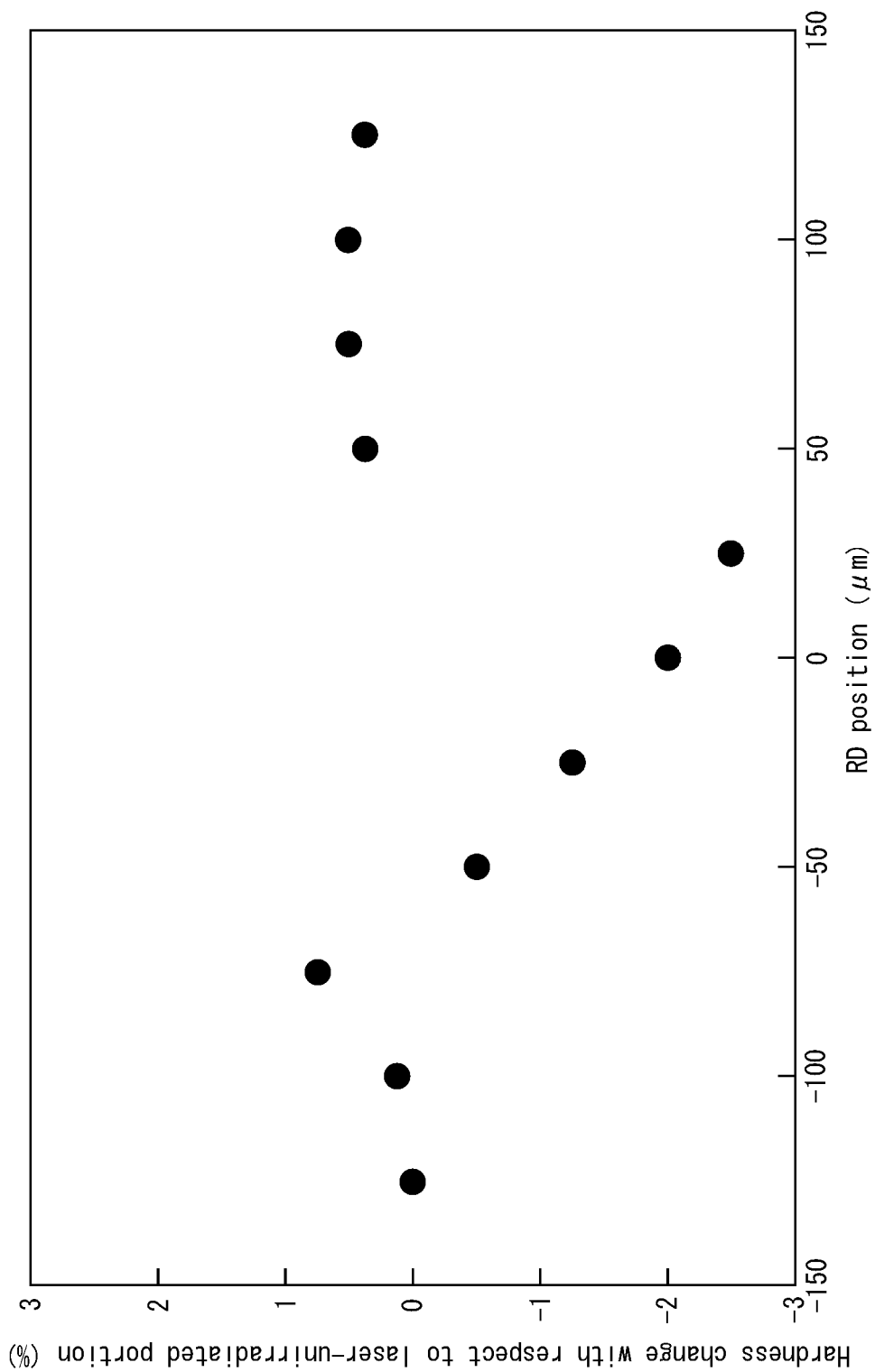
FIG. 2 illustrates the results of examining the hardness distribution of the steel sheet steel substrate near the laser-irradiated portion under conditions where high magnetic properties could not be obtained.

The hardness distribution of the steel substrate of the steel sheet surface near the laser-irradiated portion was examined under conditions where high magnetic properties could not be obtained. First, cold-rolled steel sheets (C: 0.048%, Mn: 0.10%, P: 0.005%, S: 0.002%, Al: 0.008%, N: 42 ppm, Ti+Nb+V+Zr+Ta<0.001%) with a width of 500 mm were prepared for laser irradiation. A steel slab having the chemical composition described above was hot rolled into hot-rolled steel sheets, then the hot-rolled steel sheets were subjected to hot-rolled sheet annealing at 1050° C. to obtain hot-rolled and annealed sheets, and the hot-rolled and annealed sheets were cold rolled into cold-rolled steel sheets with a sheet thickness of 0.22 mm. On the front and back surfaces of each of the cold-rolled steel sheets, a coating agent for etching resist coating formation was uniformly applied with a gravure roll to form an etching resist coating. As the coating agent for etching resist coating formation, one having a water-based alkyd resin as the main component was used. The etching resist coating was then locally removed by irradiating a laser beam on the cold-rolled steel sheet while scanning the laser beam in a transverse direction (TD). A single laser irradiation device with a diameter of 80 μm and an output of 1.8 kW was used for laser irradiation. A portion of the steel sheet surface below the laser removal portion was then etched to form linear grooves on the surface of the cold-rolled steel sheet. Next, the etching resist coating remaining on the front and back surfaces of the steel sheet was removed. After the etching resist coating was removed, the hardness of the steel substrate of the steel sheet surface near the laser-irradiated portion was measured. Hardness was measured using the micro-Vickers hardness meter and each point in the figure is the average of 15 measurement points. The hardness criterion was the value at 1 mm away from the laser-irradiated portion in the rolling direction (RD) (laser-unirradiated portion), and at each measurement point, the percentage change in the hardness of the steel substrate relative to the hardness value at the laser-unirradiated portion was investigated. The hardness of the steel substrate was measured after the sheet was taken just before etching and the resist coating was completely removed from both the front and back surfaces of the steel sheet. FIG. 2 illustrates the results. The RD position in the figure indicates the position in the rolling direction (RD) at the center portion of the steel sheet in the width direction, with the center of laser irradiation on the steel sheet used as the origin. As is apparent from the figure, a clear decrease in hardness was observed on the surface of the steel sheet in the laser-irradiated portion. The hardness decrease is considered to be caused by the heating of the steel substrate by high-output laser irradiation and the recovery of the rolled microstructure.

Then, the cold-rolled steel sheet with the above-mentioned linear grooves and a cold-rolled steel sheet without linear grooves taken from the cold-rolled steel sheet before the above-mentioned linear grooves were formed as a comparative material were each subjected to primary recrystallization annealing at 860° C., which also served as decarburization annealing, to make primary recrystallized sheets, and then the primary recrystallized sheets were subjected to secondary recrystallization annealing at a maximum temperature of 1200° C. to make secondary recrystallized sheets. Furthermore, for the cold-rolled steel sheet without grooves, linear grooves were formed on the steel sheet surface under the same high-output laser conditions as above after secondary recrystallization annealing. Both steel sheets were then annealed to flatten the sheets and form insulating tension coatings, and the iron loss ($W_{17/50}$) was measured. As a result, it was found that the iron loss of the cold-rolled steel sheet with grooves was 0.005 W/kg higher than that of the secondary recrystallization annealed sheet with grooves. Here, the iron loss of each steel sheet was measured based on the method for evaluating "the iron loss in the center portion in the widthwise direction" described below. Based on these results, we believed that the microstructural changes corresponding to the hardness decrease described above had some effect on the degradation of the magnetic properties of the grain-oriented electrical steel sheet.

Furthermore, we considered that in order to remove the etching resist coating from the defective shape portion of the metal strip as well as the good shape portion, after applying the coating agent for etching resist coating formation, the defective shape portion of the metal strip is mechanically crushed and straightened by a special jig to flatten the defective shape portion. However, there was a risk that the etching resist coating would be worn away when the shape of the defective shape portion was mechanically straightened. Therefore, we have keenly studied the possibility of uniformly forming a resist pattern to form grooves in the widthwise direction during the application stage of the coating agent for etching resist coating formation. Then, we have conceived of irradiating a laser on a roller applied with the coating agent for etching resist coating formation and removing the coating agent for etching resist coating formation to thereby form a resist pattern having the removed portion of the coating agent for etching resist coating formation (hereinafter referred to as the laser removal portion) on the roller surface, and bringing the roller into contact with the steel sheet to transfer the resist pattern from the roller to the steel sheet. Further, we have considered that in this way, a good resist pattern can be formed even in the defective shape portion of the metal strip, without causing thermal effects such as hardness decrease on the metal strip, and thus uniform grooves can be formed in the widthwise direction of the metal strip.

Figure 3:
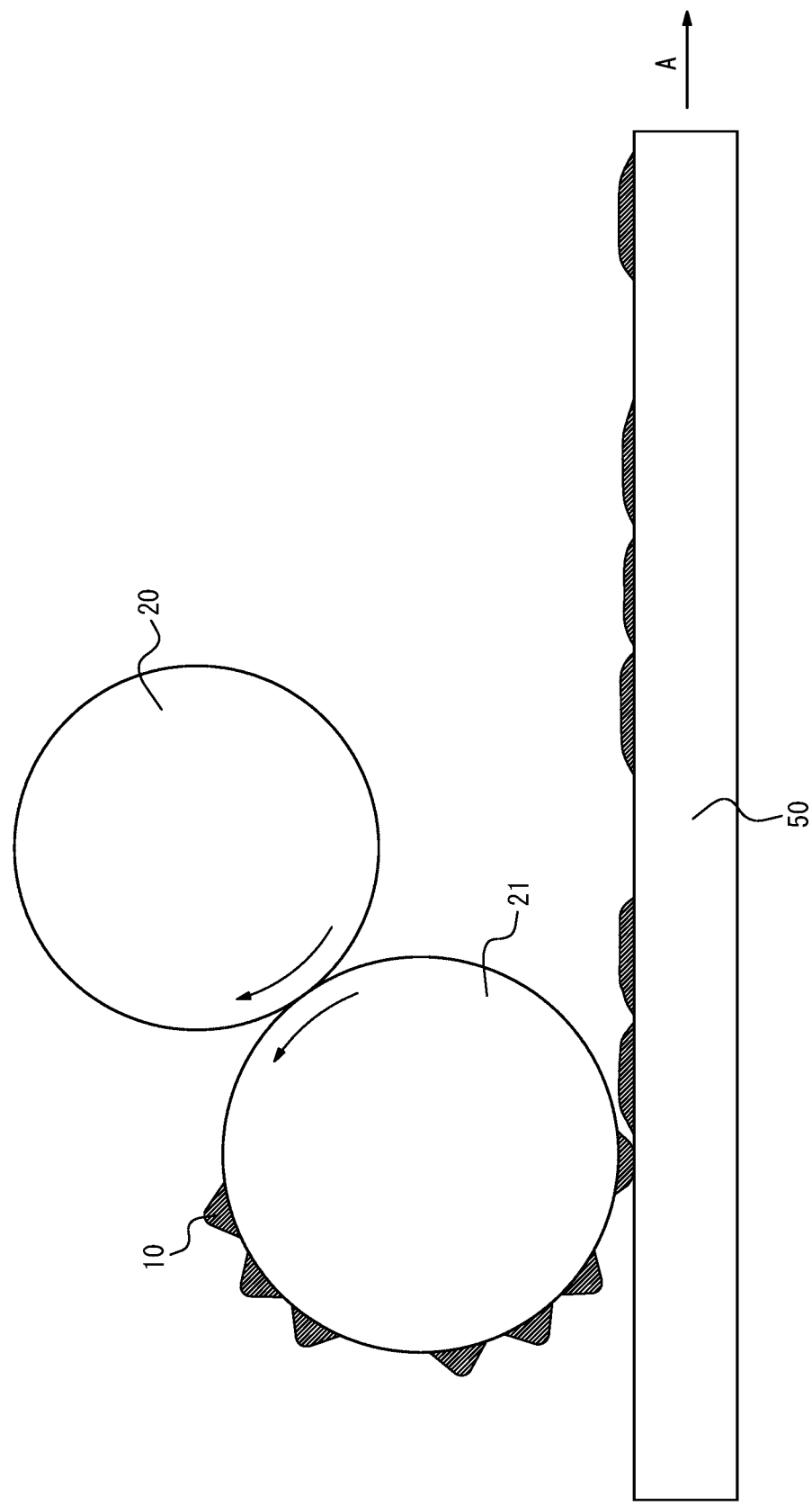
FIG. 3 illustrates the conventional transfer method of a coating agent for etching resist coating formation.

As a method for forming a resist pattern to form grooves in the applying stage of coating agent for etching resist coating formation, a method is known that a coating agent for etching resist coating formation is applied in a pattern on a gravure roll and the coating agent for etching resist coating formation on the gravure roll surface is transferred to the metal strip surface by gravure offset printing. However, the difficulty of forming grooves uniformly by the method is described in the above-mentioned PTL 2 and other publicly known documents. As illustrated in FIG. 3, in the gravure offset printing, the transfer of a coating agent 10 for etching resist coating formation from a gravure roll 20 to the surface of a metal strip 50 conveyed in a conveyance direction A is performed via an offset roll 21. At that time, the shape of the coating agent 10 for etching resist coating formation transferred to the surface of the offset roll 21 is a convex bowl shape facing outward from the offset roll 21, as illustrated in FIG. 3. As a result, when the coating agent 10 for etching resist coating formation is transferred to the surface of the metal strip 50, the resist pattern on the surface of the metal strip 50 may become non-uniform.

Figure 4:
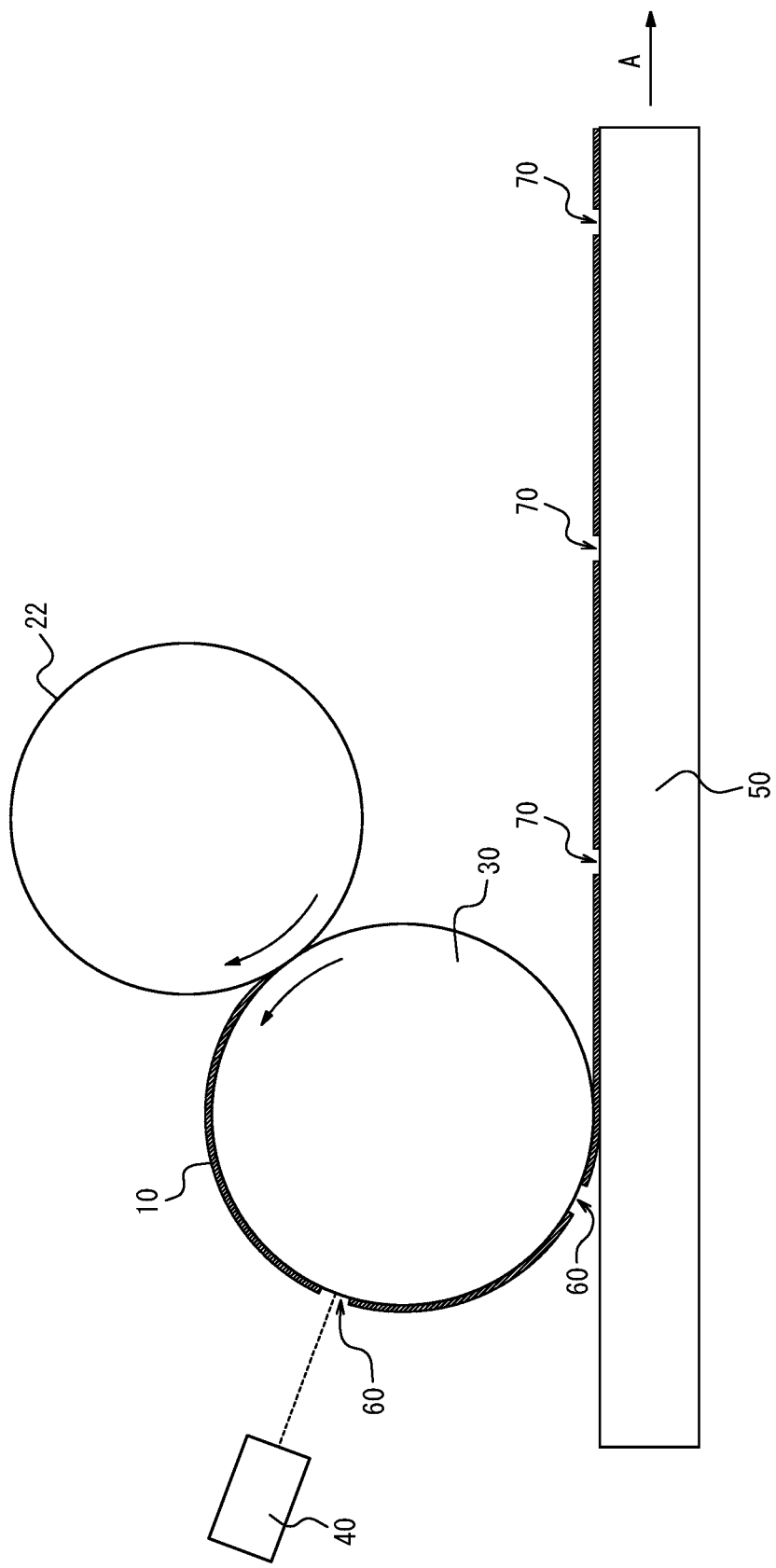
FIG. 4 illustrates one example of the transfer method of a coating agent for etching resist coating formation of the present disclosure.

In contrast, in the present disclosure, as illustrated in FIG. 4, a laser is irradiated using a laser irradiation device 40 or the like on a roller 30 uniformly applied with the coating agent 10 for etching resist coating formation to remove the coating agent 10 for etching resist coating formation and form a resist pattern having a laser removal portion 60 of the coating agent 10 for etching resist coating formation. While forming the resist pattern, the formed resist pattern is transferred from the surface of the roller 30 to the surface of the metal strip 50 conveyed in the conveyance direction A to thereby allow the resist pattern to be transferred from the surface of the roller 30 to the surface of the metal strip 50 before the shape of the coating agent 10 for etching resist coating formation changes and thus an uniform resist pattern can be formed.

The following describes the best embodiment of the present disclosure. The present disclosure is not limited to the following embodiment. The method for forming grooves according to the present embodiment comprises applying a coating agent for etching resist coating formation to a roller;

then, irradiating a laser on the roller while scanning the laser in an axial direction of the roller or in a direction inclined to the axial direction to remove a portion of the coating agent for etching resist coating formation irradiated by the laser;

then, bringing the roller into contact with at least one side of the metal strip to transfer the coating agent for etching resist coating formation to the at least one side of the metal strip, with an unapplied area corresponding to the removed portion of the coating agent for etching resist coating formation, or bringing the roller into contact with an intervening roller intervening between the roller and the metal strip to bring the intervening roller into contact with at least one side of the metal strip to transfer the coating agent for etching resist coating formation to the at least one side of the metal strip, with an unapplied area corresponding to the removed portion of the coating agent for etching resist coating formation;

then, drying the coating agent for etching resist coating formation to form an etching resist coating with the unapplied area on the at least one side of the metal strip; and then, etching a portion of the metal strip below the unapplied area to form grooves.

The coating agent 10 for etching resist coating formation is applied to the surface of the metal strip 50 as follows. First, the coating agent 10 for etching resist coating formation is uniformly applied to the roller 30 by such means as bringing the roller 30 into contact with the coating agent 10 for etching resist coating formation in a container. As illustrated in FIG. 4, after the coating agent 10 for etching resist coating formation is applied to another roller 22, the another roller 22 may be brought into contact with the roller 30 to apply the coating agent 10 for etching resist coating formation to the roller 30. Details of the coating agent 10 for etching resist coating formation are described below. If the another roller 22 is used, the another roller 22 may have gravure cells formed as in the conventional gravure offset printing method, but to apply the coating agent 10 more uniformly on the roller 30, it is more preferable that the another roller 22 has no gravure cells. Further, the roller 30 may have gravure cells, but when no gravure cells are formed, there is no need to consider changes in cell shape due to wear of the roller 30, even when the roller 30 is brought into contact with the metal strip 50, as in the conventional techniques. Therefore, without using the method in which, as in the conventional gravure offset printing method, the coating agent 10 for etching resist coating formation on the surface of one roller (in the gravure offset printing method, gravure roll 20) is transferred to another roller (in the gravure offset printing method, offset roll 21), and the coating agent 10 for etching resist coating formation is transferred to the metal strip surface via the another roller, the coating agent 10 for etching resist coating formation applied to the single roller 30 can be transferred to the surface of the metal strip 50 without using the another roller.

As described below, the laser is irradiated on the roller 30 while being scanned in an axial direction of the roller 30 or in a direction inclined to the axial direction of the roller 30 to thereby remove the coating agent 10 for etching resist coating formation and form, on the roller 30, a resist pattern of the coating agent 10 for etching resist coating formation having the laser removal portion 60 so that linear grooves extending the direction that intersects a rolling direction of the metal strip 50 can be formed. When the laser is scanned in the direction inclined to the axial direction of the roller 30, the direction in which the laser is scanned is preferably within 45° with respect to the axial direction of the roller 30 corresponding to the transverse direction (TD) of the metal strip 50. By setting the laser scanning direction to within 45° with respect to the axial direction of the roller 30, the etching treatment described below can form grooves with an angle of 45° or less with respect to the transverse direction (TD) of the metal strip 50, which can suitably subdivide the magnetic domain structure and reduce iron loss when the metal strip is a grain-oriented electrical steel sheet. Further, in order to form the grooves with high precision, the beam scanning is preferably controlled in synchronization with the rotation of the roller 30. When a polygon mirror is used for laser deflection, the rotation of the polygon mirror is preferably synchronized with the rotation of the roller. The laser conditions are described below. The laser is preferably irradiated close to the point where the roller 30 and the surface of the metal strip 50 come into contact. By irradiating the laser close to the position where the roller 30 and the surface of the metal strip 50 come into contact, a uniform resist pattern can be formed even when the coating agent 10 for etching resist coating formation has low viscosity or when the shape of the coating agent 10 for etching resist coating formation is easily changed due to surface tension or gravity after patterning the coating agent 10 for etching resist coating formation by the laser.

After forming the resist pattern of the coating agent 10 for etching resist coating formation having the laser removal portion 60 on the roller 30, the roller 30 is brought into contact with one or both surfaces of the metal strip 50 to transfer (apply) the coating agent 10 for etching resist coating formation on the surface of the roller 30 to one or both surfaces of the metal strip. The laser removal portion 60 on the roller 30 corresponds to an unapplied area 70 on the metal strip 50. In one example, as illustrated in FIG. 4, the roller 30 is rotated while being brought into contact with the metal strip 50 conveyed in the conveyance direction A. At this time, it is desirable to adjust the amount of the coating agent 10 for etching resist coating formation on the roller by doctor blade or other means and the pressing pressure of the roller 30 so that the thickness of the etching resist coating is uniform within the surface of the metal strip 50.

In addition to the method of directly bringing the roller 30 on which the resist pattern is formed into contact with the surface of the metal strip 50 as described above, as illustrated in FIG. 5, the roller 30 may be brought into contact with an intervening roller 31 (such as the conventional offset roll 21) that intervenes between the roller 30 and the metal strip to transfer the coating agent 10 for etching resist coating formation uniformly applied to the roller 30 and having the pattern formed to the intervening roller 31, and then the intervening roller 31 may be brought into contact with the surface of the metal strip 50 to further transfer the coating agent 10 for etching resist coating formation that has been transferred from the roller 30 to the intervening roller 31 to the surface of the metal strip 50. In this case, the coating agent 10 for etching resist coating formation is transferred from the roller 30 to the intervening roller 31 while maintaining uniformity. Therefore, it is possible to prevent the coating agent 10 for etching resist coating formation from becoming a convex bowl shape, as in the conventional method where the coating agent accumulated in gravure cells is transferred to the offset roll. By transferring the coating agent 10 for etching resist coating formation to the surface of the metal strip 50 via the intervening roller 31 in this way, the viscosity of the coating agent 10 for etching resist coating formation can be increased and the coating weight of the coating agent 10 for etching resist coating formation can be adjusted. The number of the intervening roller 31 intervening between the roller 30 and the metal strip 50 is not limited. For example, after the roller 30 is brought into contact with the intervening roller 31 to transfer the coating agent 10 for etching resist coating formation to the intervening roller 31, the intervening roller 31 may be further brought into contact with a second intervening roller (not illustrated) intervening between the intervening roller 31 and the metal strip 50 to transfer the coating material 10 for etching resist coating formation to the second intervening roller. The second intervening roller may then be brought into contact with the surface of the metal strip 50 to further transfer the coating agent 10 for etching resist coating formation transferred to the second intervening roller to the surface of the metal strip 50.

The etching resist coating 10 is preferably formed on the front and back surfaces of the metal strip 50, but the resist pattern having the unapplied area 70 to form grooves as described above should be formed on at least one side of the metal strip 50.

Since heat accumulates in the roller 30 due to laser irradiation, the roller 30 is preferably cooled at all times. The roller 30 is preferably made of a metal with high thermal conductivity to prevent heat accumulation.

After the coating agent 10 for etching resist coating formation is transferred to the surface of the metal strip 50, the coating agent 10 for etching resist coating formation is dried before the etching treatment described below to form an etching resist coating on the surface of the metal strip 50. When drying the coating agent 50 for etching resist coating formation, the drying temperature is preferably 180° C. to 300° C. The drying method is not limited. For example, the coating agent 50 for etching resist coating formation can be dried by blowing hot blast. The metal strip 10 is then subjected to an etching treatment to etch the portions of the metal strip surface not covered by the etching resist coating. Etching may be performed by either chemical or electrolytic etching. For electrolytic etching, the electrolyte is preferably an aqueous solution of NaCl or KCl. After the etching treatment, the etching resist coating is removed from the surface of the metal strip 50 to thereby obtain the metal strip with grooves. The etching resist coating is preferably removed with an alkali or organic solvent.

The groove formed on the surface of the metal strip 50 is a linear groove extending in the direction that intersects the rolling direction of the metal strip 50. The groove morphology can be adjusted by adjusting the resist pattern on the roller 30. When the metal strip 50 is a grain-oriented electrical steel sheet, the angle of the linear groove to the transverse direction (TD) of the metal strip is preferably 45° or less from the viewpoint of subdividing the magnetic domain structure and reducing iron loss. Here, one groove does not necessarily have to extend the full width of the metal strip 50 in the direction that intersects the rolling direction, and two or more laser irradiation device may be used to irradiate lasers so that multiple grooves continuously extend the full width of the metal strip. When manufacturing a grain-oriented electrical steel sheet, grooves are preferably formed repeatedly at periodic interval in the rolling direction of the metal strip 50 in order to more effectively reduce iron loss. The shape of the linear grooves can be adjusted by the laser beam shape and etching conditions, and for grain-oriented electrical steel sheet, the groove preferably has a width of 30 μm or more and 200 μm or less, and a depth of 10 μm or more and 40 μm or less. When grooves are formed on the surface of grain-oriented electrical steel sheet, the groove width is more preferably 100 μm or less. The linear grooves are preferably formed periodically in the rolling direction of the metal strip. The periodic interval of the linear grooves is preferably 1 mm or more and 30 mm or less for grain-oriented electrical steel sheet. By setting the periodic interval of the linear grooves to 1 mm or more, the volume of the steel substrate in the grain-oriented electrical steel sheet can be more suitably secured and a more suitable magnetic flux density can be obtained. In addition, by setting the periodic interval of the linear grooves to 30 mm or less, a higher magnetic domain refining effect can be obtained. In the case of forming linear grooves periodically, the groove interval need not be uniform within the metal strip 50, and the groove interval may be adjusted within the above range (1 mm or more and 30 mm or less) by changing the irradiation conditions of the laser on the roller 30 depending on the position of the metal strip 50 in the rolling direction.

Laser

A laser beam is used to locally heat and vaporize the coating agent 10 for etching resist coating formation applied to the roller 30 and remove it. Since the laser is usually irradiated on the metal strip 50 with a width of 1 m or more, multiple laser irradiation devices are often used, but it is preferable to use three or less laser irradiation devices. More preferably, two or less devices are used. Using two or less laser irradiation devices can reduce the time required for equipment maintenance and improve productivity. On the other hand, by using more than one laser irradiation devices, the beam performance can be made more uniform over the entire laser-scanned region. Further, since the laser is scanned at high speed over the roller, the laser scanning is preferably performed by rotating and driving a polygon mirror. In addition, in order to prevent the locally removed coating agent 10 for etching resist coating formation from dirtying the laser beam path, it is preferable that the removed coating agent for etching resist coating formation be collected by a dust collector by means of an air blast or other means. By not dirtying the laser beam path, the laser beam performance can be prevented from being altered by the locally removed coating agent 10 for etching resist coating formation.

The laser output is preferably 2.0 kW or less. By setting the laser output to 2.0 kW or less, the roller 30 can be prevented from becoming hotter and thus melting of the roller 30 can be more suitably prevented. In addition, the low-output laser has an advantage over the high-output laser in that the low-output laser can output a laser beam with a smaller diameter compared to the high-output laser, and thus, when forming linear grooves on the surface of a grain-oriented electrical steel sheet, the groove width to be formed can be narrower to reduce iron loss.

The laser preferably has a strength profile of top-hat type. When a laser with a strength profile of Gaussian-type is used, the quality of the coating material 10 for etching resist coating formation near the laser removal portion is changed by heat, making it difficult to be transferred to the metal strip 50. A laser with a strength profile of top-hat type can be obtained by conventionally known methods. For example, the laser can be shaped so as to have a strength profile of top-hat type by using a resonator for multimode or by using a beam shaping element. The top-hat type refers to a beam shape that satisfies the following equation: beam diameter r>beam diameter R×0.64, where the distance between two points corresponding to $2/3$ times the maximum beam strength is the beam diameter r and the distance between two points corresponding to $1/2$ times the maximum beam strength is the beam diameter R in the beam profile strength profile (where the horizontal axis is the beam position/distance and the vertical axis is the strength).

The beam diameter in the direction orthogonal to the scanning direction of the laser on the surface of the roller 30 is preferably 200 μm or less. By reducing the beam diameter in the direction orthogonal to the scanning direction of the laser on the roller 30 to 200 μm or less, the removal width of the coating agent 10 for etching resist coating formation can be narrowed. This allows the groove width formed after etching to be narrower, which in turn reduces the iron loss of the grain-oriented electrical steel sheet in which grooves are formed. The beam diameter in the direction orthogonal to the scanning direction of the laser on the surface of the metal strip 50 is more preferably 150 μm or less, and further preferably 100 μm or less. No lower limitation is placed on the beam diameter, but the beam diameter in the direction orthogonal to the scanning direction of the laser on the roller surface is preferably 30 μm or more in order to form a groove width of 30 μm or more. No limitation is placed on the ratio of the major axis to the minor axis of the laser (major axis diameter/minor axis diameter), but the upper limit is set to 5.0 because an excessive increase in the ratio reduces the ability to remove the coating agent 10 for etching resist coating formation. The decrease in the ability to remove the coating agent 10 for etching resist coating formation as the ratio of major axis to minor axis ratio is increased is thought to be due to a decrease in the power density of the laser which is expressed as output/beam area. For a laser with a strength profile of Gaussian-type (here, a laser with a profile where the beam diameter r≤beam diameter R×0.64), the beam diameter indicated in this specification is the distance between two points corresponding to $1/e^2$ times the maximum value of the beam strength in the strength profile, and for a laser with a strength profile of top-hat type, it is the value indicated by the half width.

Preferably, used as the laser is a fiber laser. By using the fiber laser, a laser beam with a smaller diameter can be irradiated. A fiber laser with a short axis diameter of 200 μm or less is preferably used as the fiber laser.

A greater scanning rate of the laser on the roller 30 is advantageous in increasing productivity. For increased productivity, the scanning rate of the laser on roller 30 is preferably at least 400/(number of laser irradiation device) m/s. On the other hand, in order to sufficiently heat the coating agent 10 for etching resist coating formation by laser irradiation and suitably form desired grooves, the upper limit of the scanning rate of the laser is preferably 400 m/s when three laser irradiation devices are used and 600 m/s when two laser irradiation devices are used.

Etching Resist Coating and Coating Agent for Etching Resist Coating Formation

To prevent corrosion of the surface of the metal strip 50 during the etching process, the coating agent 10 for etching resist coating formation having the unapplied area 70 is transferred to the surface of the metal strip 50 to form an etching resist coating. It is preferable that the L* value be set to 0 or more and 70 or less in the CIELAB color space (CIE 1976 L*a*b* color space), in which the color tone of the etching resist coating is quantified by spectral reflectance measured with a spectrophotometer. By reducing the L* value, a low-output laser can be used, and narrow grooves can be formed on the surface of the metal strip 50 while preventing melting of the roller 30, and thus a grain-oriented electrical steel sheet with extremely excellent magnetic properties can be provided. The lightness L* of the etching resist coating is preferably 65 or less and more preferably 60 or less.

An etching resist coating (organic) having any of alkyd resin, epoxy resin, and polyethylene resin as main component is preferable but other etching resist coatings can be used. For example, an inorganic coating that serves as a tension coating on a grain-oriented electrical steel sheet may be used as etching resist coating. The thickness of the etching resist coating is preferably 0.1 μm or more and 4 μm or less. Excessively thick etching resist coating leads to increased cost and also increases the amount of deformation near the resist defective portion during transfer from the roller to the steel sheet. Therefore, the thickness of the etching resist coating should be as small as possible within the range where the coating agent for etching resist coating formation can be applied uniformly, and etching can be performed normally.

The lightness L* value of the etching resist coating can be adjusted by adjusting the mix proportion of the pigment component in the coating agent for etching resist coating formation 10. For example, it is possible to adjust the lightness L* value of the etching resist coating by adjusting an amount of at least one of white pigment and black pigment in a solvent partially containing alkyd resin within a range where the ratio of the total amount of white pigment and black pigment in terms of solid content to the total solid content in the coating agent for etching resist coating formation is 0.01 mass % or more and 95 mass % or less. Considering cost, it is more preferable that the ratio of the total amount of white pigment and black pigment in terms of solid content to the total solid content in the coating agent for etching resist coating formation be 0.01 mass % or more and 30 mass % or less. Publicly known black substances such as titanium oxide, iron phosphide, and carbon can be used as black pigment. Publicly known white substances such as zinc and titanium oxides can be used as white pigment.

The coating agent for etching resist coating formation of the present disclosure may contain other components as long as they do not impair the effects of the present disclosure. Other components include, for example, surfactants, rust inhibitors, lubricants, defoamers, antioxidants, leveling agents. These other components are added to further improve the performance of the etching resist coating and the uniform applicability of the coating agent for etching resist coating formation. The total mix proportion of these other components (in terms of the mix proportion in the dry coating) should be 95 mass % or less in terms of solid content with respect to the total solid content in the coating agent for etching resist coating formation from the viewpoint of maintaining sufficient etching resist coating performance.

Inorganic Coating

As mentioned above, the etching resist coating may be an inorganic coating that serves as a tension coating on the grain-oriented electrical steel sheet. For the coating composition, the insulating tension coating for grain-oriented electrical steel sheet described in the publicly known literature (e.g., WO2015/064472A1) can be used as a base, but since most of publicly known insulating tension coatings for grain-oriented electrical steel sheet are colorless and transparent, it is necessary to adjust the color tone separately. For example, an inorganic coating solution containing 20 mass % to 80 mass % phosphate (Mg phosphate, Al phosphate, Ca phosphate, etc.) in terms of solid content, 0 mass % to 10 mass % chromium oxide in terms of solid content, and 20 mass % to 50 mass % silica in terms of solid content can be used as a base, and the lightness L* value of the coating can be adjusted by adjusting the mix proportion of the pigment components such as black and white pigments as with the organic etching resist described above to form an insulating tension coating.

Metal Strip

The type of metal strip 50 on which grooves are formed by the groove formation method of this disclosure is not limited. In grain-oriented electrical steel sheet, its iron loss can be reduced by forming grooves on the steel sheet surface. As described above, the groove formation method of this disclosure can form narrow grooves even on the defective shape portion of the metal strip 50 while reducing the thermal effects of laser irradiation on the steel sheet. Therefore, by forming grooves on the steel sheet surface using the groove formation method, the iron loss of grain-oriented electrical steel sheet can be effectively reduced.

The final steel composition of the grain-oriented electrical steel sheet is not particularly limited and can be any publicly known steel composition, but it is preferable to contain C: 30 ppm or less, Si: 1% to 7%, P: 0.1% or less, Mn: 0.1% or less, S: less than 10 ppm, and N: 20 ppm or less. The C content is preferably less than 30 ppm because excessive C content will impair iron loss due to magnetic aging. The Si content is preferably 1% or more because Si increases specific resistance and reduce iron loss. Since P also increases specific resistance, P may be contained from the viewpoint of iron loss reduction. However, because a high P content may impair manufacturability, and lowers saturation magnetic flux density, the P content is preferably 0.1% or less. Mn and S are preferably kept within the above mentioned range because excessive content of Mn and S form precipitates such as MnS to thereby deteriorate iron loss. N is preferably minimized as much as possible because it precipitates silicon nitride and the like during stress relief annealing, thereby impairing iron loss. As for the other components, based on the conventional knowledge, there is no problem if they are added so that the crystal orientation after secondary recrystallization is sharpened in the Goss orientation, but in the case of forming a forsterite film, Cr that develops anchors should be as little as possible, and Cr content is preferably 0.1% or less. The elements Ti, Nb, V, Zr, and Ta are preferably set to 0.01% or less in total because they degrade iron loss by forming carbides and nitrides.

When assembling the iron core of a transformer, the outermost surface layer of the grain-oriented electrical steel sheet should be eventually coated with an insulating tension coating to improve insulation between the layers. The thickness of the resulting metal strip is preferably in the range of 0.10 mm to 0.35 mm. When manufacturing the grain-oriented electrical steel sheet, a non-heat-resistant type of magnetic domain refining treatment may be further applied by laser irradiation or other means.

Method for Manufacturing Grain-oriented Electrical Steel Sheet

One example of the method for manufacturing a grain-oriented electrical steel sheet utilizing the groove forming method of the present disclosure comprises
  hot rolling a steel slab into a hot-rolled steel sheet,
  then, subjecting the hot-rolled steel sheet or a hot-rolled and annealed sheet obtained by applying hot-rolled sheet annealing to the hot-rolled steel sheet to cold rolling once, or twice or more with intermediate annealing performed therebetween to obtain a cold-rolled steel sheet,
  then subjecting the cold-rolled steel sheet to primary recrystallization annealing to obtain a primary recrystallized sheet, and
  then, subjecting the primary recrystallized sheet to secondary recrystallization annealing to obtain a secondary recrystallized sheet,
  wherein linear grooves are formed on a surface of the steel sheet at any stage after being subjected to hot rolling by the groove forming method mentioned above. The primary recrystallization annealing may also serve as decarburization to reduce carbon and nitriding to increase nitrogen in the steel sheet. Secondary recrystallization annealing here refers to annealing for selective abnormal grain growth of Goss-oriented grains. Secondary recrystallization annealing may also serve as a process for forming a forsterite film and purifying the elements in the steel.

Grooves are formed on the steel sheet surface at any stage after hot rolling. The metal strip to be grooved can be the hot-rolled steel sheet after hot rolling, the hot-rolled and annealed sheet obtained by subjecting the hot-rolled steel sheet to hot-rolled sheet annealing, the cold-rolled steel sheet after cold rolling when cold rolling is performed once, the cold-rolled steel sheet before or after intermediate annealing when cold rolling is performed twice or more with intermediate annealing performed therebetween, or the cold-rolled steel sheet after cold rolling is performed after intermediate annealing, the primary recrystallized sheet after primary recrystallization annealing, or the secondary recrystallized sheet after secondary recrystallization annealing. Since the groove may disappear if rolling is performed after groove formation, grooves should be formed on the cold-rolled steel sheet after cold rolling when cold rolling is performed once, the cold-rolled steel sheet after cold rolling after the last intermediate annealing when cold rolling is performed twice or more with intermediate annealing performed therebetween, the primary recrystallized sheet after primary recrystallization annealing, and the secondary recrystallized sheet after secondary recrystallization annealing. Groove formation may be performed at multiple stages after hot rolling.

EXAMPLES

Manufacture of Metal Strip

A steel slab containing 3.4% Si (C: 0.050%, Mn: 0.05%, P: 0.01%, S: 0.002%, Al: 0.014%, N: 70 ppm, Ti+Nb+V+Zr+Ta<0.002%) was hot rolled into hot-rolled steel sheets, the hot-rolled steel sheets were annealed at 1050° C. to obtain annealed sheets, and then the annealed sheets were cold rolled into cold-rolled steel sheets with a sheet thickness of 0.22 mm and used as metal strips with a width of 1200 mm for grooving . In the steel sheets, defective shape portions with edge wave were observed from the edge in the widthwise direction to a position of approximately 50 mm in the widthwise direction.

A resist pattern of a coating agent for etching resist coating formation was formed on one side of each of the steel sheets by one of the following methods (1) to (3).

(1) After uniformly applying a coating agent for etching resist coating formation on a steel sheet, a laser is irradiated while being scanned on the metal strip in the transverse direction to locally remove a portion of the coating agent for etching resist coating formation irradiated by the laser to form the laser removal portion.

(2) As illustrated in FIG. 3, after uniformly applying a coating agent for etching resist coating formation on the roller 30, a laser is irradiated while being scanned in the axial direction of the roller 30 (corresponding to the transverse direction of the metal strip) to locally remove a portion of the coating agent for etching resist coating formation irradiated by the laser to form the laser removal portion. Then, by pressing the roller 30 against the steel sheet, the coating agent for etching resist coating formation is transferred to the steel sheet.

(3) As illustrated in FIG. 4, after uniformly applying a coating agent for etching resist coating formation on the roller 30, a laser is irradiated while being scanned in the axial direction of the roller 30 (corresponding to the transverse direction of the metal strip) to locally remove a portion of the coating agent for etching resist coating formation irradiated by the laser to form the laser removal portion. Then, the coating agent for etching resist coating formation on the roller 30 is transferred to the steel sheet via the intervening roller 31.

The resist pattern had areas where no coating agent for etching resist coating formation is applied in a linear pattern along the transverse direction of the steel sheet at 3.3 mm repetition intervals in the rolling direction. The composition (in terms of solid content) of the coating agent for etching resist coating formation is listed in Table 1. On the other surfaces of the steel sheet, the coating agent for etching resist coating formation was applied to the entire surfaces. On both the front and back surfaces of the steel sheet, the coating thickness of the coating agent for etching resist coating formation was approximately 1 μm. After application, the coating agent for etching resist coating was dried at 220° C. for 30 sec to form etching resist coatings on both the front and back surfaces of the steel sheet.

TABLE 1

| | Content (mass %) | | | |
|---|---|---|---|---|
| L* | Water-based alkyd resin | White pigment (zinc oxide-based) | Black pigment (iron oxide-based) | Other components |
| 77 | 8.0 | 85 | 0.5 | 6.5 |
| 51 | 36.5 | 20 | 0.5 | 43 |

Measurement of Lightness L* of Etching Resist Coating

The lightness L* in CIELAB color space (CIE 1976 L*a*b* color space) was measured for the formed etching resist coating. The lightness L* was quantified by spectral reflectance measured with a spectrophotometer. Table 2 lists the measurement results.

Evaluation of Resist Removability

The laser removability of the etching resist coating was evaluated by visually judging the appearance of the peeled line after laser irradiation. The following criteria were used. o was considered "passed". The results are provided in Table 2.

Criteria o: peeled area of laser-irradiated portion is 95% or more
x: peeled area of laser-irradiated portion is less than 95%

Next, electrolytic etching was applied to the steel sheet. The electrolyte was NaCl, and the current density was adjusted in advance so that desired grooves were formed. After etching, the etching resist coating remaining on the front and back surfaces of the steel sheet was removed with NaOH solution. The liquid temperature of the NaOH solution was maintained at 50° C. to 70° C. The steel sheet was then washed with water, followed by surface cleaning and grooves were formed on the surface. The cold-rolled steel sheet with linear grooves was then subjected to primary recrystallization annealing at 860° C. to make a primary recrystallized sheet, and the primary recrystallized sheet was subjected to secondary recrystallization annealing at a maximum temperature of 1200° C. to make a secondary recrystallized sheet. The secondary recrystallized sheet was applied with a phosphate-based coating agent for insulating tension coating formation and then annealed at a maximum arrival temperature of 860° C. to flatten the sheet and form an insulating tension coating, resulting a grain-oriented electrical steel sheet with a sheet thickness of 0.22 mm. Table 2 provides the laser irradiation conditions. Characterization of the grain-oriented electrical steel sheet was performed as follows. The evaluation results are listed in Table 2.

Measurement of Groove Width

Groove Width at the Center Portion in the Widthwise Direction

For the groove width at the center portion of the steel sheet in the widthwise direction, 10 test pieces with a width of 80 mm and a length of 300 mm were taken at the center portion of the steel sheet in the widthwise direction, and the groove width was measured using an optical microscopy at 20 arbitrary points in the rolling direction in each sample for a total of 200 points and averaged.

Groove Width at Edge 1 in the Widthwise Direction

For the groove width at the edge 1 of the steel sheet in the widthwise direction, 10 test pieces with a width of 80 mm and a length of 300 mm were taken at the edge of the DR side (drive side in the cold mill) of the steel sheet, and the groove width was measured using an optical microscopy at 20 arbitrary points in the edge of the DR side in the rolling direction in each sample for a total of 200 points and averaged.

Groove Width at Edge 2 in the Widthwise Direction

For the groove width at the edge 2 of the steel sheet in the widthwise direction, 10 test pieces with a width of 80 mm and a length of 300 mm were taken at the edge of the OP side (operator side in the cold mill) of the steel sheet, and the groove width was measured using an optical microscopy at 20 arbitrary points in the edge of the OP side in the rolling direction in each sample for a total of 200 points and averaged.

Measurement of Iron Loss $W_{17/50}$

Iron Loss at the Center Portion in the Widthwise Direction

For iron loss in the center portion of the steel sheet in the widthwise direction, two SST test pieces having a width of 100 mm and a length of 320 mm were cut from the center portion of the steel sheet in the widthwise direction along the rolling direction for a total of 40 SST test piece samples. Using the 40 SST test piece samples, a single sheet magnetic test was conducted and iron loss: $W_{17/50}$ (W/kg) was measured at a maximum magnetic flux density: 1.7 T and frequency: 50 kHz. The iron loss $W_{17/50}$ was evaluated as excellent when the iron loss $W_{17/50}$ was 0.72 W/kg or less.

Iron Loss at the Edge in the Widthwise Direction

One piece was cut from each edge of the steel sheet in the widthwise direction along the rolling direction to obtain a total of 40 SST test piece samples with a width of 100 mm. Since the endmost portion of the steel sheet in the widthwise direction tends to have a non-uniform thickness, the portion 30 mm inward from the endmost portion was treated here as edge. Using 40 SST test pieces, a single sheet magnetic test was conducted and iron loss: $W_{17/50}$ (W/kg) was measured at a maximum magnetic flux density: 1.7 T and frequency: 50 kHz. The iron loss $W_{17/50}$ was evaluated as excellent when the iron loss $W_{17/50}$ was 0.72 W/kg or less.

TABLE 2

| | Resist (Coating) | | Laser | | | | |
|---|---|---|---|---|---|---|---|
| No | L* | Method for forming resist patern | Output (kW) | Strength profile | Scanning rate (m/s) | Energy (J/m) | Beam diameter (μm) | Resist removability |
| 1 | 51 | Method (3) | 1.60 | Gaussian type | 300 | 5.3 | 150 | ○ |
| 2 | 51 | Method (2) | 1.60 | Gaussian type | 300 | 5.3 | 150 | ○ |
| 3 | 51 | Method (1) | 1.60 | Gaussian type | 300 | 5.3 | 150 | <u>x</u> |
| 4 | 51 | Method (3) | 2.40 | Gaussian type | 250 | 9.6 | 250 | ○ |
| 5 | 77 | Method (3) | 1.75 | Gaussian type | 150 | 11.7 | 200 | ○ |
| 6 | 51 | Method (1) | 2.40 | Gaussian type | 250 | 9.6 | 150 | ○ |
| 7 | 51 | Method (3) | 0.90 | Gaussian type | 200 | 4.5 | 100 | ○ |
| 8 | 51 | Method (3) | 1.60 | Top-hat type | 90 | 17.8 | 300 | ○ |
| 9 | 51 | Method (3) | 2.00 | Top-hat type | 200 | 10.0 | 200 | ○ |

| | Steel Sheet | | | | | |
|---|---|---|---|---|---|---|
| No | Groove width in edge 1 in widthwise direction (μm) | Groove width in edge 2 in widthwise direction (μm) | Groove width in center portion in widthwise direction (μm) | Iron loss in edge in widthwise direction $W_{17/50}$ (W/kg) | Iron loss in center portion in widthwise direction $W_{17/50}$ (W/kg) | Remarks |
| 1 | 133 | 134 | 136 | 0.712 | 0.698 | Example |
| 2 | 116 | 119 | 114 | 0.701 | 0.688 | Example |
| 3 | 97* | 111* | 135 | <u>0.728</u> | 0.700 | Comparative Example |
| 4 | 213 | 207 | 209 | 0.717 | 0.705 | Example |
| 5 | 172 | 174 | 177 | 0.713 | 0.701 | Example |
| 6 | 141 | 132 | 138 | <u>0.735</u> | 0.713 | Comparative Example |
| 7 | 83 | 86 | 86 | 0.690 | 0.681 | Example |
| 8 | 265 | 268 | 265 | 0.720 | 0.717 | Example |
| 9 | 175 | 178 | 177 | 0.719 | 0.706 | Example |

Underlined if outside the scope of the disclosure.
*There was a large variation, and some grooves were not formed.

INDUSTRIAL APPLICABILITY

The grain-oriented electrical steel sheet manufactured using the groove forming method of the present disclosure exhibits good magnetic properties even after annealing such as stress relief annealing and can be applied to wound-type transformers. When the grain-oriented electrical steel sheet manufactured using the groove forming method is used in transformers, they are industrially useful because energy usage efficiency can be improved.

REFERENCE SIGNS LIST

10 Coating agent for etching resist coating formation
20 Gravure roll
21 Offset roll
22 Another roller 30 Roller
31 Intervening roller
40 Laser irradiation device
50 Metal strip
60 Laser removal portion
70 Unapplied area
A Transport direction

The invention claimed is:

1. A method for forming grooves on a surface of a metal strip, comprising
applying a coating agent for etching resist coating formation to a roller;
then, irradiating a laser on the roller while scanning the laser in an axial direction of the roller or in a direction inclined to the axial direction to remove a portion of the coating agent for etching resist coating formation irradiated by the laser;
then, bringing the roller into contact with at least one side of the metal strip to transfer the coating agent for etching resist coating formation to the at least one side of the metal strip, with an unapplied area corresponding to the removed portion of the coating agent for etching resist coating formation, or bringing the roller into contact with an intervening roller intervening between the roller and the metal strip and bringing the intervening roller into contact with at least one side of the metal strip to transfer the coating agent for etching resist coating formation to the at least one side of the metal strip, with an unapplied area corresponding to the removed portion of the coating agent for etching resist coating formation;
then, drying the coating agent for etching resist coating formation to form an etching resist coating having the unapplied area on the at least one side of the metal strip; and
then, etching a portion of the metal strip below the unapplied area to form grooves.

2. The method for forming grooves on a surface of a metal strip according to claim 1, wherein the etching resist coating has a lightness $L^*$ in a CIELAB color space (CIE 1976 $L^*a^*b^*$ color space) of 0 or more and 70 or less, and an output of the laser is less than 2.0 kW.

3. The method of forming grooves on a surface of a metal strip according to claim 2, wherein the laser has a strength profile of top-hat type.

4. The method of forming grooves on a surface of a metal strip according to claim 1, wherein the laser has a strength profile of top-hat type.

5. A method for manufacturing a grain-oriented electrical steel sheet, comprising
hot rolling a steel slab into a hot-rolled steel sheet,
then, subjecting the hot-rolled steel sheet or a hot-rolled and annealed sheet obtained by applying hot-rolled sheet annealing to the hot-rolled steel sheet to cold rolling once, or twice or more with intermediate annealing performed therebetween to obtain a cold-rolled steel sheet,
then subjecting the cold-rolled steel sheet to primary recrystallization annealing to obtain a primary recrystallized sheet, and
then, subjecting the primary recrystallized sheet to secondary recrystallization annealing to obtain a secondary recrystallized sheet,
wherein grooves are formed on a surface of the steel sheet at any stage after being subjected to hot rolling by the method for forming grooves according to claim 1.

6. A method for manufacturing a grain-oriented electrical steel sheet, comprising
hot rolling a steel slab into a hot-rolled steel sheet,
then, subjecting the hot-rolled steel sheet or a hot-rolled and annealed sheet obtained by applying hot-rolled sheet annealing to the hot-rolled steel sheet to cold rolling once, or twice or more with intermediate annealing performed therebetween to obtain a cold-rolled steel sheet,
then subjecting the cold-rolled steel sheet to primary recrystallization annealing to obtain a primary recrystallized sheet, and
then, subjecting the primary recrystallized sheet to secondary recrystallization annealing to obtain a secondary recrystallized sheet,
wherein grooves are formed on a surface of the steel sheet at any stage after being subjected to hot rolling by the method for forming grooves according to claim 2.

7. A method for manufacturing a grain-oriented electrical steel sheet, comprising
hot rolling a steel slab into a hot-rolled steel sheet,
then, subjecting the hot-rolled steel sheet or a hot-rolled and annealed sheet obtained by applying hot-rolled sheet annealing to the hot-rolled steel sheet to cold rolling once, or twice or more with intermediate annealing performed therebetween to obtain a cold-rolled steel sheet,
then subjecting the cold-rolled steel sheet to primary recrystallization annealing to obtain a primary recrystallized sheet, and
then, subjecting the primary recrystallized sheet to secondary recrystallization annealing to obtain a secondary recrystallized sheet,
wherein grooves are formed on a surface of the steel sheet at any stage after being subjected to hot rolling by the method for forming grooves according to claim 3.

8. A method for manufacturing a grain-oriented electrical steel sheet, comprising
hot rolling a steel slab into a hot-rolled steel sheet,
then, subjecting the hot-rolled steel sheet or a hot-rolled and annealed sheet obtained by applying hot-rolled sheet annealing to the hot-rolled steel sheet to cold rolling once, or twice or more with intermediate annealing performed therebetween to obtain a cold-rolled steel sheet,
then subjecting the cold-rolled steel sheet to primary recrystallization annealing to obtain a primary recrystallized sheet, and
then, subjecting the primary recrystallized sheet to secondary recrystallization annealing to obtain a secondary recrystallized sheet,
wherein grooves are formed on a surface of the steel sheet at any stage after being subjected to hot rolling by the method for forming grooves according to claim 5.

* * * * *